April 26, 1932.     C. T. ANDERSON     1,855,539

VALVE

Original Filed Oct. 13, 1930    2 Sheets-Sheet 1

Inventor

C. T. Anderson

By *Clarence A. O'Brien*

Attorney

April 26, 1932. C. T. ANDERSON 1,855,539
VALVE
Original Filed Oct. 13, 1930 2 Sheets-Sheet 2
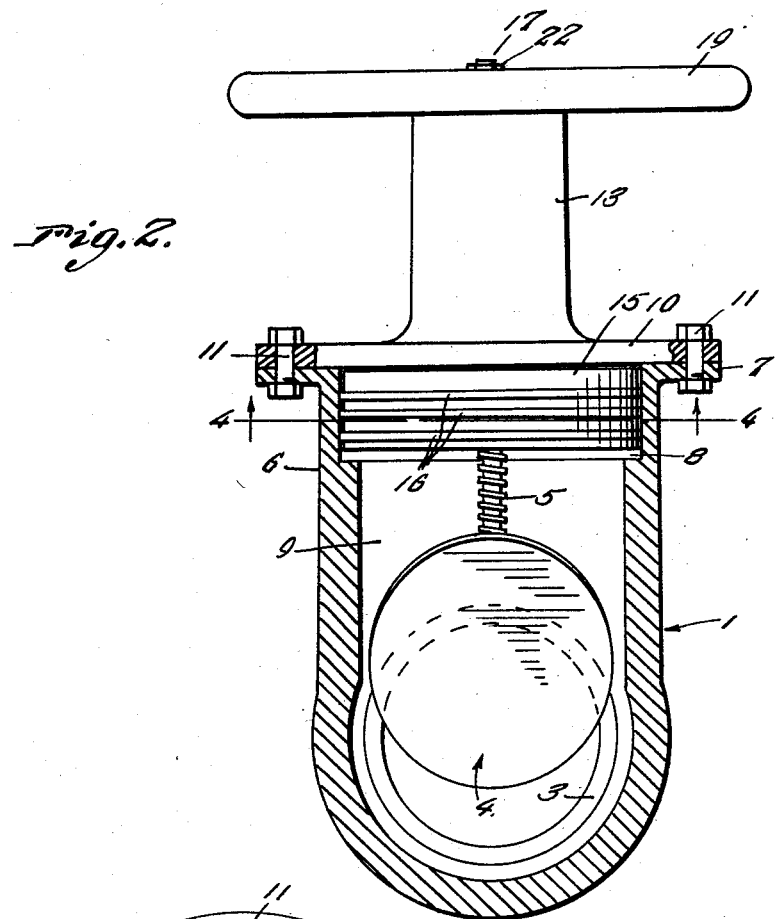
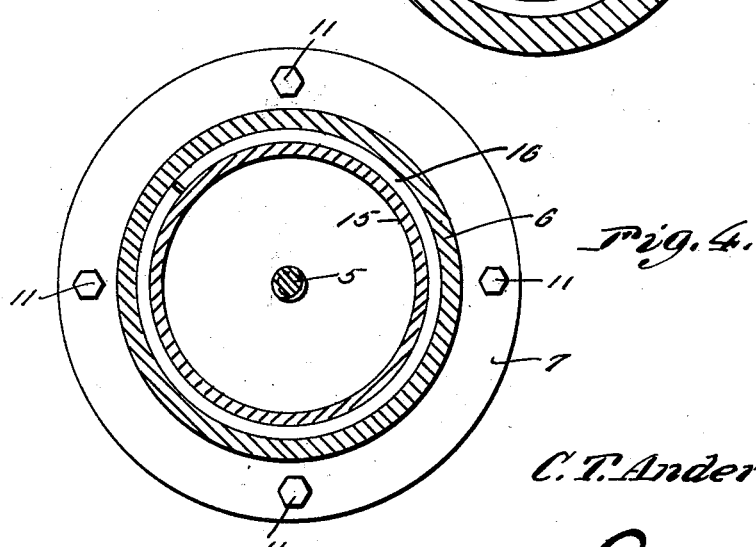
Inventor
C. T. Anderson
By Clarence A. O'Brien
Attorney Patented Apr. 26, 1932

1,855,539

UNITED STATES PATENT OFFICE

CHARLES T. ANDERSON, OF HUNTINGTON BEACH, CALIFORNIA

VALVE

Application filed October 13, 1930, Serial No. 438,513. Renewed October 22, 1931.

This invention relates generally to valves and more particularly to gate valves for use in oil pipe lines but it is understood, of course, that a valve in accordance with this invention may be used for any purpose for which same is found adapted and desirable.

The primary object of the invention is to provide, in a manner as hereinafter set forth, a valve of the aforementioned character embodying novel means for rendering same leakproof at all times and under all conditions.

Other objects of the invention are to provide a valve of the character described which will be simple in construction, strong, durable, efficient in use and which may be manufactured at low cost.

Figure 1:
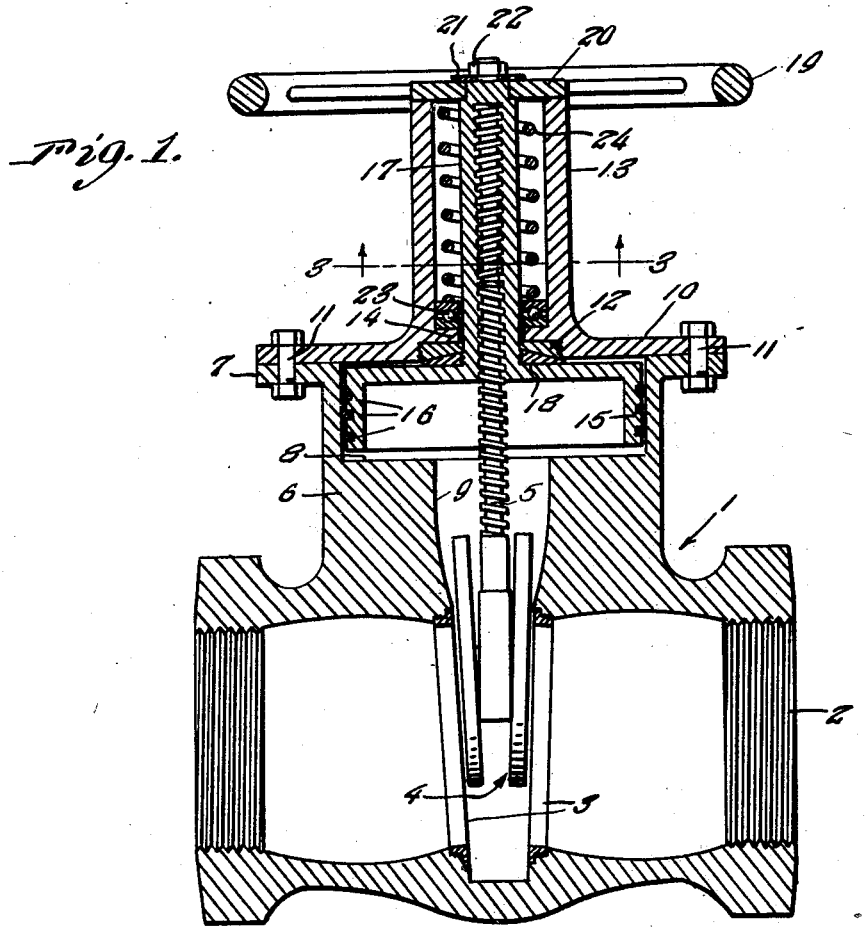
Figure 3:
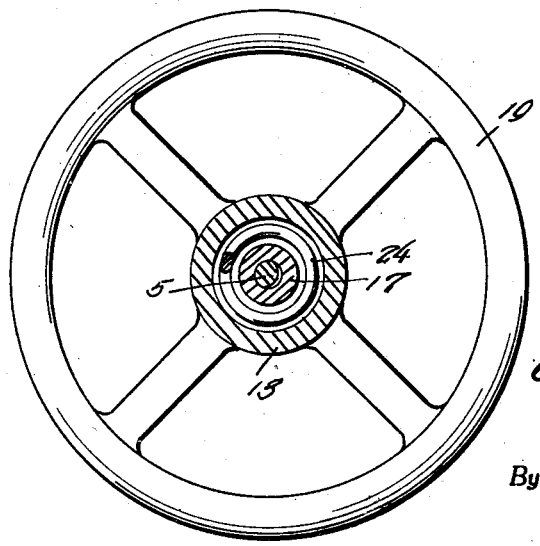

All of the foregoing and still further objects and advantages of the invention may become apparent from a study of the following specification, taken in connection with the accompanying drawings, wherein like characters of reference designate corresponding parts throughout the several views, and wherein:

Figure 1 is a view in vertical longitudinal section through a valve constructed in accordance with this invention, Figure 2 is a vertical cross sectional view through the valve, Figure 3 is a horizontal cross sectional view taken substantially on the line 3—3 of Figure 1 looking in the direction indicated by the arrows, Figure 4 is a horizontal cross sectional view taken substantially on the line 4—4 of Figure 2 looking in the direction indicated by the arrows.

Referring to the drawings in detail, it will be seen that the reference numeral 1 designates generally a valve housing or casing having the usual internally threaded opposite end portions 2 for the reception of the pipes (not shown). Conventional seats 3 are mounted in the usual manner in the housing or casing 1 for engagement by the head which is designated generally by the reference numeral 4 and is fixed on the lower end of the screw stem 5 for vertical reciprocation in the housing or casing 1.

An integral upstanding extension 6 is formed on the housing or casing 1 and is provided with an integral outturned apertured flange 7 at its upper end. The upper portion of the extension 6 is recessed to provide a cylinder 8 which communicates with the fluid passage through the valve housing or casing 1 through the passage 9 through which the screw stem 5 is operable and into which the valve head 4 is raised when in open position.

A flat circular, metallic apertured plate 10 is rigidly and detachably mounted on the upper end of the extension 6 by a bolt or the like 11 which passes through said plate and the flange 7. The plate 10 is provided with a centrally disposed threaded opening into which is screwed a ring 12 having an inclined lower side. The member 12 constitutes a sealing ring the purpose of which will be more fully hereinafter set forth. An upstanding neck 13 is formed integrally on the circular plate 10 and has formed integrally in its lower end portion the internal flange 14 which is engaged by the sealing ring 12.

A piston 15 is mounted for rotation and slight reciprocatory movement in the cylinder 8 and carries the packing rings 16 for preventing leakage past the piston 15. An upstanding internally threaded shank 17 is formed integrally on the head of the piston 15 and projects upwardly through the centrally disposed opening in the plate 10 through the opening provided by the internal flange 14 and then through the neck 13 in inwardly spaced relation to said neck 13 and terminating above the upper end of the neck. A sealing ring 18 is threaded on the lower end portion of the shank 17 for rest on the head of the piston 15 and adapted for engagement with the lower side of the sealing ring 12, the upper face of the sealing ring 18 being tapered to conform to the ring 12.

The portion of the shank 17 which extends above the neck 13 is polygonal and reduced and has fixed thereon an operating wheel 19 having a hub portion in the form of a disk 20 disposed over the upper end of the neck 13. The hub portion 20 thus constitutes a closure for the neck 13 and rests on the shoulder formed by the reduced upper end portion of the shank 17 and is secured in position by the washer 21 and the nut 22.

As clearly seen in Figure 1 of the drawings, the internally threaded shank 17 is adapted for the reception of the screw stem 5. A suitable anti-friction bearing 23 rests on the upper side of the internal flange 14 in the lower end portion of the neck 13 and the coil spring 24 encircles the shank 17 and has one end engaged on the bearing 23 and its other end engaged with the hub portion 20 of the wheel 19 in a manner to yieldingly urge said hub portion and wheel, the shank 17, the piston 15 and the sealing ring 18 upwardly to provide a leakproof joint between the sealing rings 12 and 18.

In operation, the hand wheel 19 is rotated, thus rotating the internally threaded shank 17 and the piston 15. The screw stem 5 is retained against rotation by the head 4 and therefore will be threaded into and out of the shank 17 upon rotation of said shank 17, as will be readily apparent. The packing rings 16 prevent practically all leakage past the piston 15 and the sealing rings 12 and 18 will arrest any fluid which may get past the packing rings 16.

As wear takes place on the rings 12 and 18, said wear will be compensated for by the action of the coil spring 24 raising the shank the piston 15 and the ring 18 and keeping said ring 18 constantly engaged with the ring 12.

It is believed that the many advantages of a valve constructed in accordance with this invention will be readily understood, and although the preferred embodiment of the invention is as illustrated and described, it is to be understood that changes in the details of construction may be had which will fall within the scope of the invention as claimed.

Having thus described my invention, what I claim as new is:

1. A valve of the character described comprising a casing having seats therein and a valve member engageable with the seats, an extension on the casing having a cylinder therein communicating with the interior of the casing, a plate secured on the extension over the cylinder and having an opening therein communicating with the cylinder, a piston rotatably and slidably mounted in the cylinder having packing rings engaged with the wall of the cylinder, a shank extending upwardly from the piston through the opening in the plate and having a threaded bore communicating with the cylinder, a screw stem fixed to the valve member and threadedly engaged in the bore of the shank for actuation by said shank in a manner to open and close the valve, an actuating wheel fixed on the shank, a sealing ring threaded into the opening in the plate and encircling the shank, and a sealing ring threaded on the shank and engageable with the first named sealing ring in a manner to form a leakproof joint therebetween.

2. A valve of the character described comprising a casing having seats therein and a valve member engageable with the seats, an extension on the casing having a cylinder therein communicating with the interior of the casing, a plate secured on the extension over the cylinder and having an opening therein communicating with the cylinder, a piston rotatably and slidably mounted in the cylinder having packing rings engaged with the wall of the cylinder, a shank extending upwardly from the piston through the opening in the plate and having a threaded bore communicating with the cylinder, a screw stem fixed to the valve member and threadedly engaged in the bore of the shank for actuation by said shank in a manner to open and close the valve, an actuating wheel fixed on the shank, a sealing ring threaded into the opening in the plate and encircling the shank, a sealing ring threaded on the shank and engageable with the first named sealing ring in a manner to form a leakproof joint therebetween, an upstanding neck formed integrally on the plate and disposed in spaced, concentric relation to the shank, an internal flange in the lower portion of the neck encircling the shank, an anti-friction bearing mounted on the flange within the neck, and a coil spring mounted within the neck and encircling the shank and operatively connected with said shank in a manner to yieldingly engage the second named sealing ring against the first named sealing ring.

In testimony whereof I affix my signature.

CHARLES T. ANDERSON.